United States Patent [19]

Aliberti

[11] 4,277,541

[45] Jul. 7, 1981

[54] PROTECTION OF ANHYDRIDE COPOLYMERS

[75] Inventor: Vincent A. Aliberti, Wilbraham, Mass.

[73] Assignee: Monsanto Company, St. Louis, Mo.

[21] Appl. No.: 80,849

[22] Filed: Oct. 1, 1979

[51] Int. Cl.³ .................. B32B 27/08; B05D 3/02; B28B 1/24; B29F 1/00
[52] U.S. Cl. .................... 428/518; 264/129; 427/393.5
[58] Field of Search .................. 427/385.5, 393.5; 428/515, 35, 518; 264/129, 328

[56] References Cited

U.S. PATENT DOCUMENTS

| 2,860,801 | 11/1958 | Nielsen | 428/35 X |
|---|---|---|---|
| 2,985,542 | 5/1961 | Pinsky et al. | 428/518 X |
| 3,720,633 | 3/1973 | Nickerson | 260/17.4 ST |
| 3,896,252 | 7/1975 | Tuttle | 427/306 |

FOREIGN PATENT DOCUMENTS 2547626  4/1977 Fed. Rep. of Germany .

*Primary Examiner*—Michael R. Lusignan
*Attorney, Agent, or Firm*—David Bennett; William J. Farrington; Edward P. Grattan

[57] ABSTRACT

Polymers of unsaturated acid anhydrides such as styrene/maleic anhydride copolymers can be protected from hydrocarbon attack by application of a coating of a polymer comprising pendant hydroxyl groups such as polyvinyl alcohol.

10 Claims, No Drawings

PROTECTION OF ANHYDRIDE COPOLYMERS

BACKGROUND TO THE INVENTION

It is found that polymers of unsaturated anhydride such as maleic anhydride are particularly susceptible to attach by a variety of solvents such as toluene. This can be a serious drawback for molded articles made from polymers such as copolymers of styrene and maleic anhydride and the rubber-modified equivalents of such polymers. Present invention describes a means of protecting such polymers from solvent attack.

DISCUSSION OF THE PRIOR ART

The anhydride polymers of greatest commercial interest are styrene/maleic anhydride copolymers especially when rubber-modified and/or alloyed with compatible polymers.

Typical of such polymers are those described in

| U.S. Pat. Nos. | 2,971,939, | 3,336,207, | 3,626,033, |
|---|---|---|---|
| | 3,641,212, | 3,641,212, | 3,642,949, |
| | 3,665,058, | 3,720,734, | 3,919,354, |
| | 3,966,842, | 4,051,311, | 4,082,820, |
| | 4,097,551, | 4,100,223, | 4,108,925, |
| | 4,113,797, | and | 4,137,281 |

It has been proposed for example in U.S. Pat. No. 3,896,252 that the surface of rubber-modified anhydride copolymers could be metallized and it may be supposed that such a coating would protect the polymer to some extent from a hydrocarbon solvent. However it is difficult to achieve an efficient metal coating of the polymer without at the same time weakening the polymer.

The present invention provides a process for protecting the surface of an anhydride containing polymer by providing the surface with a coating that is virtually impervious to solvent attack and has no effect on the polymer impact strength.

DESCRIPTION OF THE INVENTION

The present invention provides a process for the protection of the surface of a polymer comprising from 5 to 40% by weight of units derived from an unsaturated acid anhydride which comprises providing said surface with a coating composition comprising a polymer having pendant hydroxyl groups.

The unsaturated acid anhydride polymer can be a polymer of for example maleic anhydride, citraconic anhydride, itaconic anhydride or aconitic anhydride but maleic anhydride is by far the most common polymer component.

The anhydride can be copolymerized with vinyl-aromatic monomers such as styrene and -methyl styrene, or olefins such as ethylene. Such copolymers can also include additional monomers such as acrylate and methacrylate esters, acrylonitrile, methacrylonitrile, isobutylene, indene, norbornene and the like in addition to the above.

The copolymers can be rubber-modified either by blending with a suitable rubber or by polymerizing the monomers in the presence of the rubber.

The copolymers can also be alloyed with other polymers such as ABS, high-impact polystyrene, diene rubber grafted with acrylate esters and styrene, polycarbonates, polyamides, polyolefins, polyphenylene oxides, polymethacrylates and the like.

The restriction on such copolymerization, modification and blending is that the treated polymer contains at least 5% and preferably from 10 to 40% by weight of units (measured as maleic anhydride units) containing dicarboxylic acid anhydride groups pendant from the polymer chain.

The anhydride polymer is treated with a coating composition comprising a polymer having pendant hydroxyl groups, that is to say a polymer comprising at least 5% and preferably at least 40% or over 60% of units nominally derived from an unsaturated alcohol such as allyl alcohol or vinyl alcohol. High purity polyvinyl alcohol is very advantageous since it confers substantial inactivity to water as well as hydrocarbon resistance. Copolymers of vinyl alcohol with a vinyl ester, or any other copolymerizable monomer are also useful. A copolymer of allyl alcohol with a copolymerization monomer such as styrene. A polymer of particular utility is a copolymer of vinyl alcohol with a monomer capable of conferring on the coating copolymer a flame resistant character.

It is believed that the anhydride groups form a strong bond with the alcohol groups so giving excellent adhesion between the two. Whatever the reason it would appear that a durable protective coating is formed that shows excellent adhesion to the substrate.

The protective coating composition may be applied as a preformed film using heat and pressure. However it is often preferred to apply the coating by dipping, spraying or painting the composition onto the surface of the anhydride polymer. The composition may comprise the polymer as an aqueous solution or varnish in a suitable solvent (inert to the substrate of course) which is heated after application so as to remove the solvent and to enhance bonding to the substrate anhydride polymer.

It is often advantageous to incorporate into the coating composition an effective amount of a substance that is capable of crosslinking any free hydroxyl groups. Such substance includes for example boric acid, a hydrolyzed alkyl silicate and formaldehyde. This is especially significant with a coating composition comprising polyvinyl alcohol or copolymers having a high proportion of the (notional) vinyl alcohol monomer units. These tend to be very slightly water sensitive and the use of such a crosslinking agent can significantly reduce this sensitivity.

The process can be applied to the anhydride polymer in any form but preferably it is applied to shaped articles or sheets from which shaped articles are to be thermoformed. The articles can be shaped by extrusion, injection molding, thermoforming or any other suitable shaping process.

The character of the coating polymer determines to some extent the nature of the protection afforded. Thus polymers containing a large proportion, say above about 50% by weight, of vinyl alcohol units give excellent hydrocarbon resistance as is shown in Example 1 below. Polymers of styrene and allyl alcohol such as are illustrated in Example 2 below however tend not to demonstrate the same hydrocarbon resistance but give good protection against aqueous solutions, particularly alkaline solutions.

In effect by tailoring the composition of the coating polymer, a very wide range of protective coatings can be provided, each having very good adhesion to the substrate.

DESCRIPTION OF THE PREFERRED EMBODIMENTS

The invention is now more particularly described with reference to the following Example which is for the purposes of illustration only and is not intended to imply any limitation on the essential scope of the invention.

EXAMPLE 1

An injection molded sample of a rubber-modified styrene/maleic anhydride copolymer containing about 24 percent by weight of maleic anhydride was coated on one side with an aqueous solution of 1-30 Gelvatol ® (a low molecular weight, highly hydrolyzed polyvinyl acetate polymer available under that designation from Monsanto Company). The coating was laid on with a 10 mil blade and the sample was cured for 10-15 minutes at 90° C. The sample was then immersed in toluene for 5 minutes at room temperature.

Upon removal it was found that the uncoated side was heavily pitted whereas the coated side was unscathed. The coating could not be separated from the sample by flexing, scraping or peeling.

This indicates the outstanding level of protection that can be achieved by the process of the invention.

EXAMPLE 2

An injection molded sample of a rubber-modified styrene/maleic anhydride copolymer similar to that used in Example 1 was treated with a 25 percent methanolic dispersion of a styrene/allyl alcohol copolymer containing 7.7 percent by weight of allyl alcohol monomer units.

The coating showed excellent adhesion to the sample even though the hydroxyl content of the coating is comparatively low.

It is forseen that many variations or modifications could be made to the invention described herein without departing from the essential spirit of the invention. It is intended that all such variations and modifications be embraced within the purview of this invention.

I claim:

1. A process for the protection of the surface of a polymer comprising a vinylaromatic monomer and from 5 to 40 percent by weight of units derived from maleic anhydride which comprises applying to said surface a coating composition comprising a polymer with pendant hydroxyl groups.

2. A process according to claim 1 which comprises applying an aqueous solution of a polyvinyl alcohol to the surface of a polymer comprising a rubber-modified copolymer of styrene and maleic anhydride and heating to remove the solvent and adhere the coating to the polymer surface.

3. A process according to claim 1 in which the polymer comprises styrene and maleic anhydride.

4. A process according to claim 3 in which the polymer is a rubber modified copolymer of styrene and maleic anhydride.

5. A process according to claim 3 in which the polymer is an alloy comprising a component which is a rubber-modified copolymer of styrene with maleic anhydride.

6. A process according to claim 1 in which the coating composition comprises an effective amount of a substance capable of crosslinking free pendant hydroxyl groups in the coating.

7. A process according to any one of claims 1 to 6 in which the polymer with pendant hydroxyl groups is a polymer comprising at least 40 percent by weight of units nominally derived from vinyl alcohol.

8. A process according to claim 7 in which the vinyl alcohol polymer is polyvinyl alcohol.

9. A process according to claim 1 in which the polymer comprising pendant hydroxyl groups is applied as a solution to the surface of the maleic anhydride polymer.

10. An article wherein the surface is protected by a process according to any one of claims 1, 9 and 2.

* * * * *